Oct. 31, 1967  W. HEIER  3,349,690
BEVERAGE BREWING APPARATUS
Filed Oct. 15, 1964  5 Sheets-Sheet 1

INVENTOR.
William Heier
BY
Synnestvedt & Lechner
ATTORNEYS

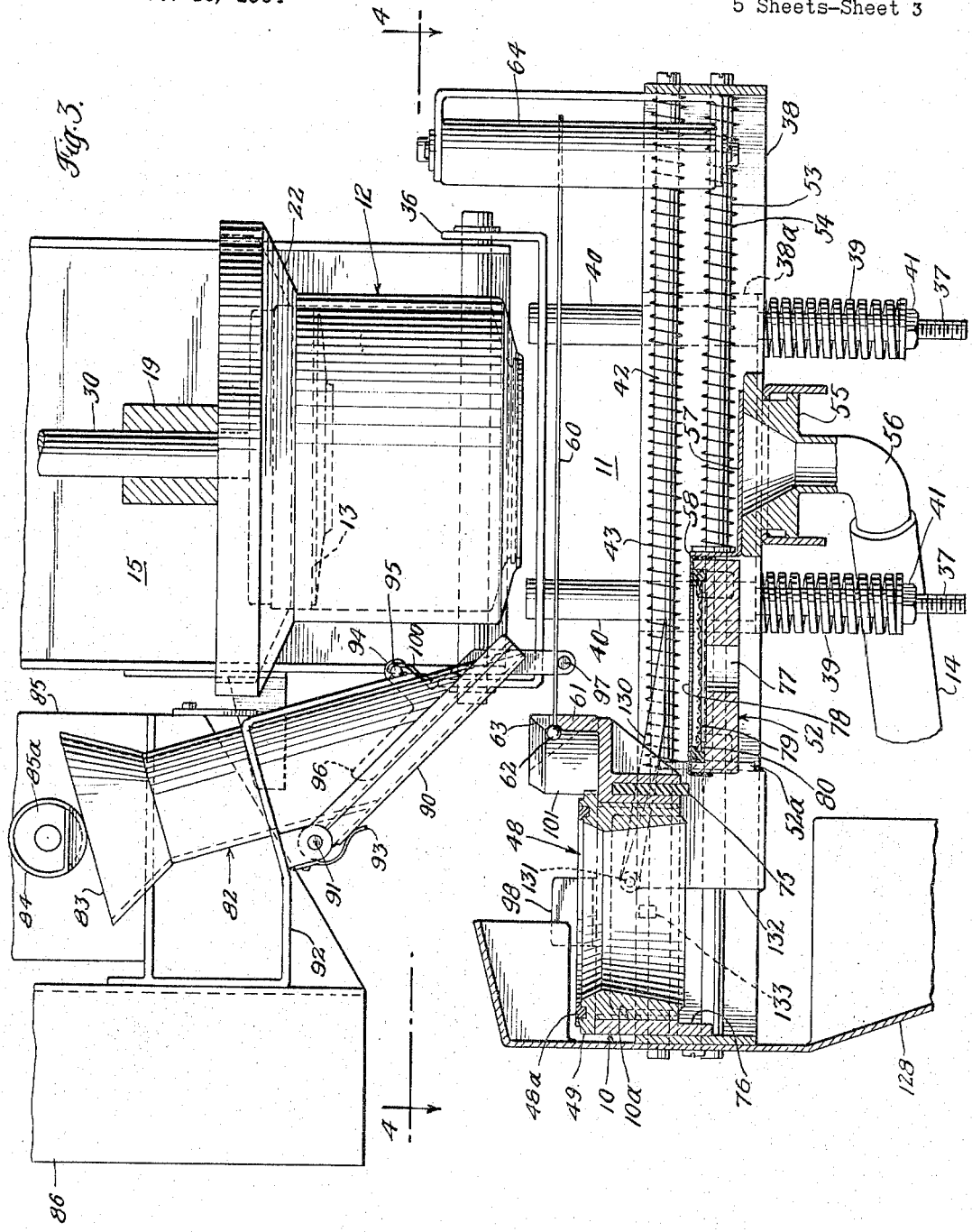

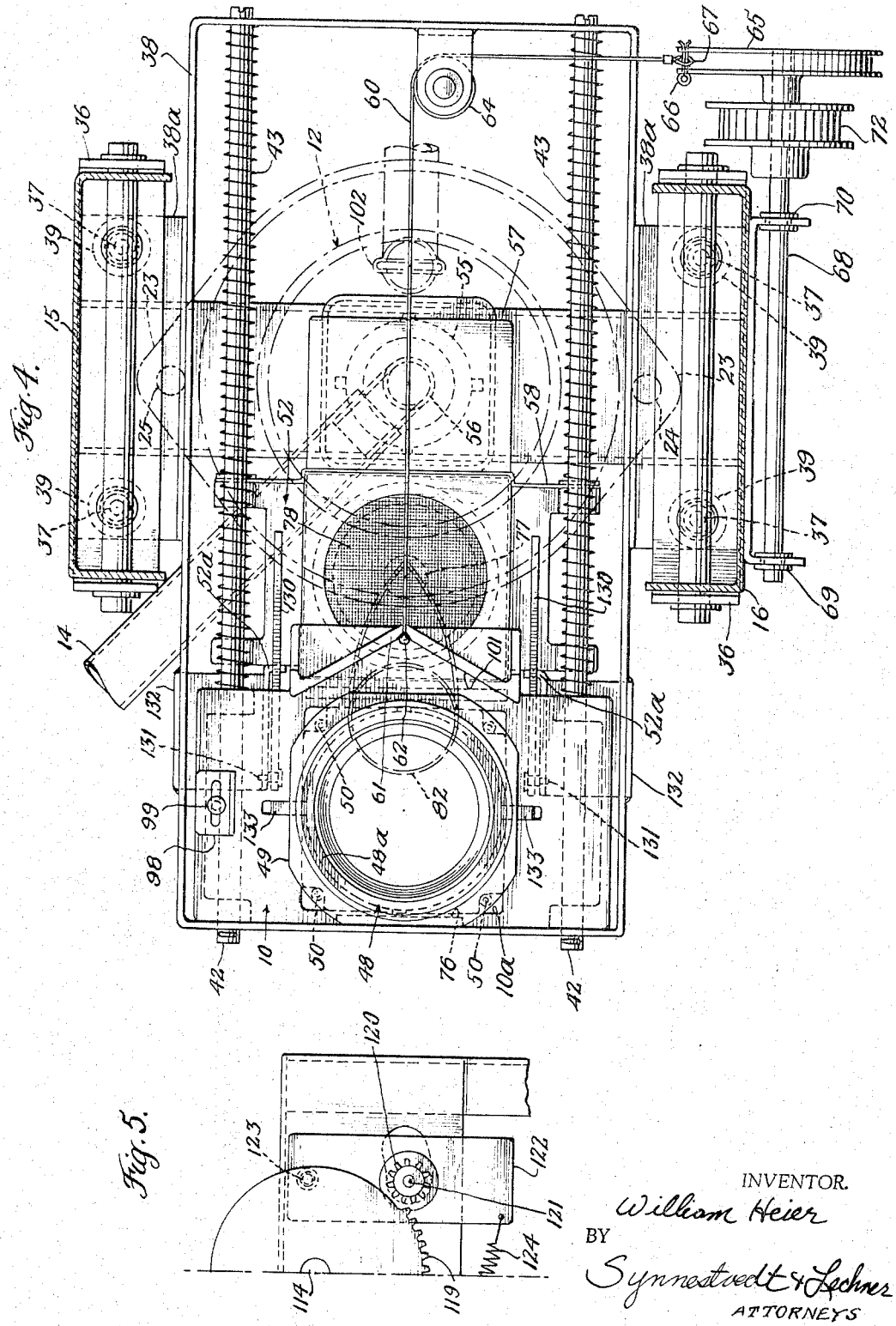

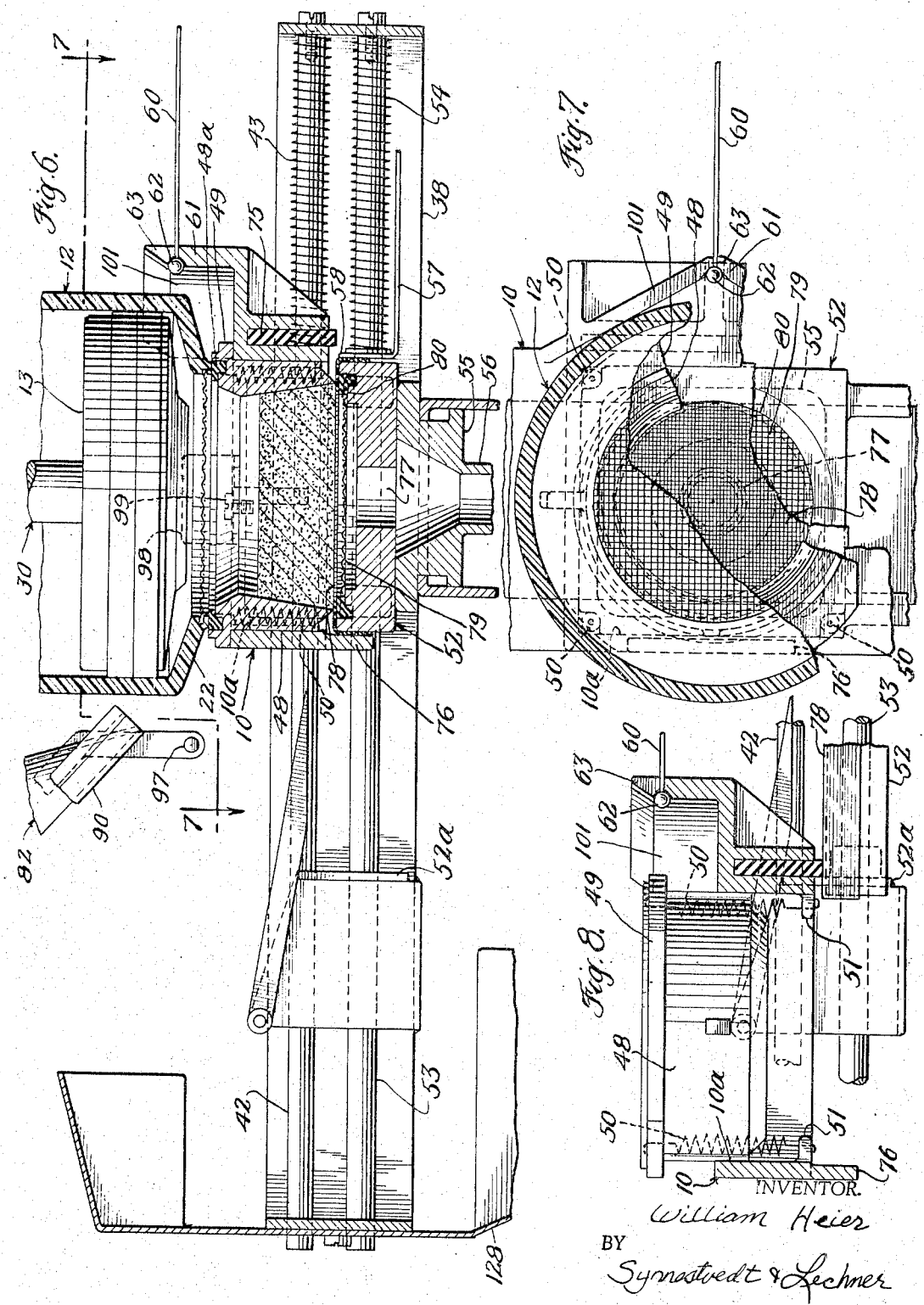

United States Patent Office 3,349,690
Patented Oct. 31, 1967

3,349,690
BEVERAGE BREWING APPARATUS
William Heier, Warminster, Pa., assignor to Rudd-Melikian, Inc., Warminster, Pa., a corporation of Pennsylvania
Filed Oct. 15, 1964, Ser. No. 404,113
20 Claims. (Cl. 99—283)

This invention relates to apparatus for brewing beverages and more particularly, to apparatus for rapidly preparing cup size quantities of hot coffee or the like from a freshly ground charge of a beverage material.

While not limited thereto, the invention is especially suitable for use in connection with coin operated vending equipment. Circumstances of use of such vending equipment create many problems which in the past have made it extremely difficult to provide satisfactory brewing machines; particularly in the case of coffee machines capable of producing fresh, truly-flavored coffee.

This is largely because these machines are located in offices, shops, schools and other buildings where the demand for coffee or other hot beverage may occur at widely spaced intervals. The beverage must be fresh notwithstanding the fact that several hours often elapse between selections of a particular beverage, and the users of the equipment are unwilling to wait for service more than a few moments after they have deposited their coin.

In addition, brewing equipment suitable for use in vending machines must be extremely dependable. It must be easy to clean and to repair. It is preferred that the brewing machine be capable to using stock beverage forming commodities which do not need special handling or packaging.

With the foregoing considerations in mind, it is a primary object of the present invention to provide brewing apparatus capable of rapidly brewing, on demand, hot beverages from a beverage forming material.

Another object of the invention is the provision of improved brewing apparatus capable of brewing cup-sized quantities of coffee from freshly ground coffee.

A more specific object of the invention is the provision of coffee brewing apparatus having improved means for disposing of the spent coffee grounds subsequent to a brewing operation.

A still further object of this invention is the provision of brewing apparatus which possesses the qualities of simplicity and reliability necessary in equipment used in the vending machine industry.

How these and other objects are achieved will be fully set forth in the following description and in the accompanying drawings in which:

FIGURE 3 is an enlarged sectional view of the apparatus taken along lines 3—3 of FIGURE 1;

FIGURE 4 is a plan sectional view of the apparatus of FIGURE 1 taken along the line 4—4 of FIGURE 3;

FIGURE 5 is a detail view showing a releasable drive connection used in conjunction with the drive mechanism of the present invention;

FIGURE 6 is an enlarged sectional view taken from the side of the apparatus showing the parts in brewing position;

FIGURE 7 is a plan view of the apparatus taken along the section lines 7—7 of FIGURE 6; and FIGURE 8 is a detail view of the mechanism for discharging the spent grounds from the coffee carrying container subsequent to operation of the brewer.

Figure 1:
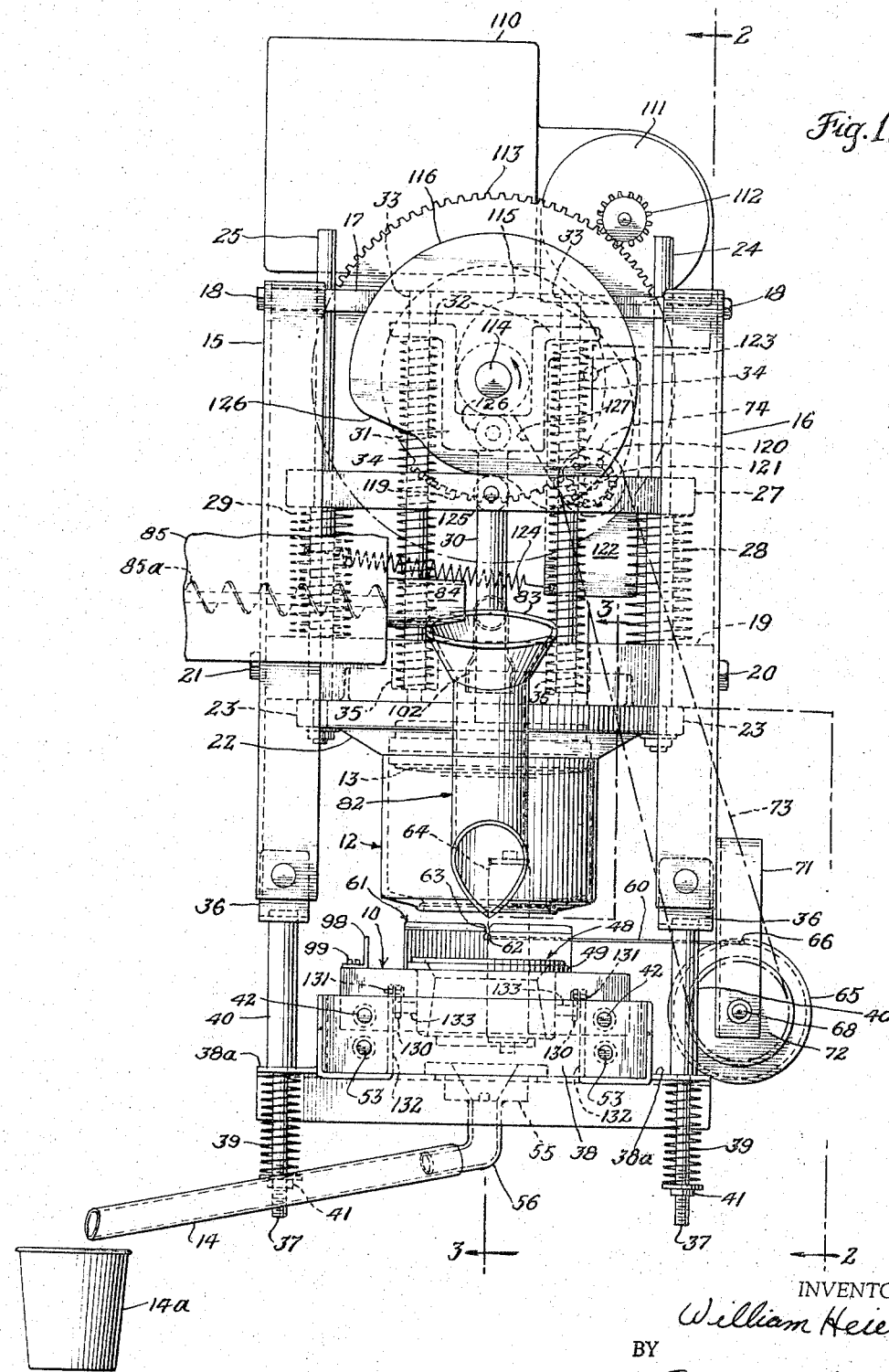
FIGURE 1 is a front elevational view of a preferred form of apparatus embodying the present invention.

For purposes of orientation, the basic portions of the apparatus will first be briefly described before turning to a more detailed description of the mechanism.

Referring first to FIGURE 3, a movable carriage 10 is illustrated which, at the start of a brewing cycle initiated by a coin operated switch for example, moves a coffee carrying cup or receptacle to a brewing station 11 beneath the open end of a cylinder shaped brew member 12. When the carriage is properly aligned beneath the cylinder, the cylinder moves downwardly into a water tight sealing engagement with the cup. This forms a brewing chamber which is filled with hot water and thereafter piston 13 moves downwardly to force the water through the ground coffee and through an outlet conduit 14 (FIG. 1) to a cup 14a placed at a dispensing station. Thereafter the carriage moves the receptacle containing the spent coffee grounds to its retracted position and the grounds are disposed of by mechanism to be described subsequently.

Turning now to the more detailed description of the invention, the brewing equipment is mounted in a housing including side plates 15 and 16. As shown in FIGURE 1, the side plates 15 and 16 are held in spaced apart relationship by any convenient means such as a beam 17 bolted to the plates by machine bolts 18 at the top of the plate members. Further support is provided by a support beam 19 which is bolted to the side plates by machine bolts 20 and 21. The cross beam 19 serves as a reaction point for several of the moving members of the apparatus to be described hereinafter.

The side frame members 15 and 16 may be mounted within and form a part of conventional vending machine equipment not shown. The aforementioned cylinder 12 is located immediately below the cross beam 19. The upper end of the cylinder flares outwardly slightly as shown at 22 and is provided with diametrically spaced lugs 23.

The cylinder is mounted for vertical movement with respect to the reaction beam 19 by the following mechanism. A pair of upwardly extending rods 24 and 25 are bolted to the lugs 23 as may be seen in FIGURES 1 and 2. Rods 24 and 25 are guided in apertures in the cross beam 19 and also in the horizontal beam 17 located at the top of the frame. The rods 24 and 25 pass through holes in a movable beam 27 intermediate the cross beams 17 and 19. Beam 27 is secured to each of the rods 24 and 25 by any suitable fastening means. Coil springs 28 and 29 are mounted on the rods 24 and 25 respectively. The springs seat on the reaction beam 19 and resiliently urge the beam 27, the rods 24 and 25, and the cylinder 12 to the raised position shown in FIGURE 1.

Piston 13 is fitted for sliding movement within the cylinder 12. A piston rod 30 is fixed to, and extends upwardly from the piston 13. The piston rod is guided for axial movement in a hole provided in reaction beam 19 and has a generally U-shaped portion 31 at its upper end. The U-shaped member is provided with outwardly extending arms 32 which are mounted for sliding movement on a pair of guide rods 33. Compression springs 34 are mounted on each guide rod 33. The springs seat in recesses 35 in the reaction beam 19 and bear against the under-side of arms 32 to urge the piston to the upper position shown in FIGURE 1.

The carriage 10 forms a part of a cyclically operable drive train for conveying a charge of coffee to the brewing station 11. The carriage is supported on a framework which is secured to the frame members 15 and 16 by means of two spaced apart U-shaped brackets 36, one of which is clearly shown in FIGURE 3. Each of the brackets 36 carries a pair of guide rods 37. A rectangularly shaped frame 38 is provided with angle members 38a having holes drilled therein to slidably receive the guide rods. The frame 38 is urged upwardly by means of heavy compression springs 39 which are mounted on the ends of each of the rods 37. The springs exert an upward force against the flanges 38a which bear against the lower ends of spacer sleeves 40 carried by each of the rods. The ends of the rods 37 are threaded to receive nuts 41, which may be adjusted to vary the force exerted by the springs 39.

The rectangular frame 38 supports a pair of rod-like rails 42 upon which the carriage 10 rides. Springs 43 urge the carriage into the left hand retracted position as viewed in FIGURES 2 through 4.

As may be seen in FIGURE 4, the carriage 10 is generally rectangular in shape and is provided with an opening 10a which supports a sleeve-like insert 48. The sleeve-like insert 48 has a flange 49 normally resting against the top surface of the carriage, held in place by means of springs 50 (see FIGURE 8) connected to the flange and to lugs 51. The springs pull the insert downwardly into the position in which it seats firmly on the carriage. The interior walls of the insert 48 flare downwardly and outwardly as shown in FIGURES 3 and 6, for reasons which will become apparent hereinafter.

A sub-carriage 52 is slidably mounted on a second pair of rails 53 located parallel to and slightly below the rails 42. The sub-carriage 52 is urged by means of springs 54 into a position intermediate that of the retracted position of the carriage 10 and the brewing station 11.

A drain structure 55 is also mounted on the rectangular frame 38 as best shown in FIGURES 3 and 6. This structure is positioned directly beneath and in axial alignment with the cylinder 12 at a point slightly below the sub-carriage 52. The drain is provided with an outlet spout 56, communicating with the conduit 14 leading to the dispensing station at which point a cup 14a is placed prior to initiation of the brewing cycle. A cover plate 57 normally rests over the opening of the drain 55 to protect it from being contaminated with dirt or coffee grounds. The cover has an upstanding leg 58 which is slidably mounted on rails 53. The cover is urged against the carriage 52 by the springs 53 which, as mentioned above, also function to move the carriage 52 to its retracted position against a stop 52a.

The carriage 10 is adapted to be moved to the right as shown in FIGURE 3 by drive means, including a cable 60 which is attached to the center of an upright V-shaped abutment 61, mounted on the carriage (see FIGURE 4). A bead 62, secured to the end of the cable fits in a groove 63 which may be seen in FIGURE 1. The cable is guided around a roller 64 attached to the frame 38 and from there it is connected to a pulley 65 (FIGURES 2 and 4) by means of a pin 66 which passes through an eye 67 on the end of the cable.

Figure 2:
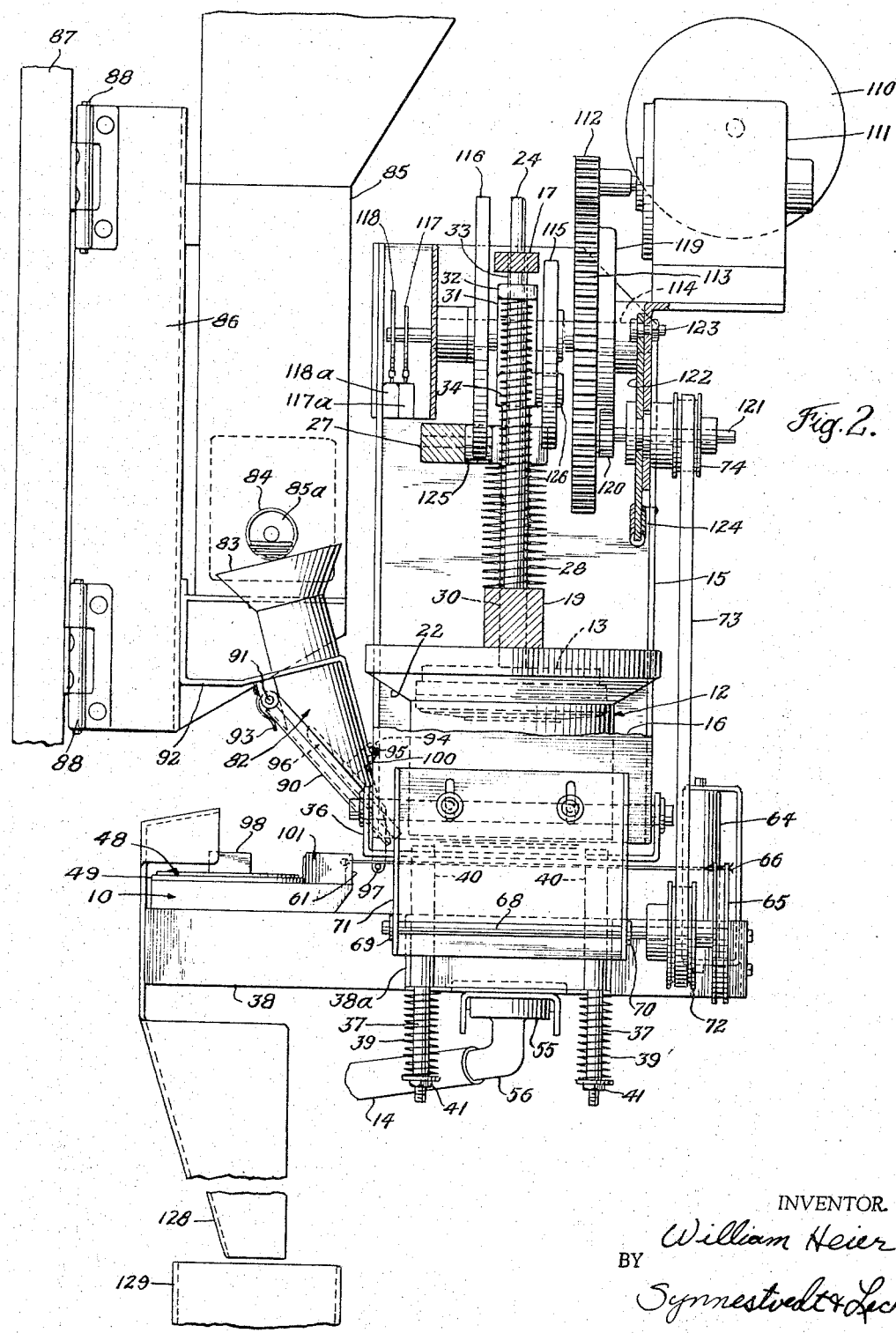
FIGURE 2 is a side elevational view partly in section, taken along lines 2—2 of FIGURE 1.

The pulley 65 is fixed on a shaft 68 which is journalled for rotation in bearings 69 and 70 in a channel-shaped bracket 71 secured to the right hand frame member 16 of FIGURE 2. A sprocket 72 is also fixed to the shaft 68 and a timing belt 73 passes around the sprocket and over a drive sprocket 74 spaced above sprocket 72, as viewed in FIGURE 2. Drive sprocket 74 is driven by a motor and a releasable drive connection to be described hereinafter. The drive sprocket drives the sprocket 72 to rotate shaft 68 and pulley 65. Thus the cable is wrapped onto the pulley 65. This movement causes the cable to draw the carriage from the left hand position shown in FIGURE 3 to a position beneath the cylinder 12. Upon movement to the right, a wiper blade 75, formed, for example, of rubber or felt, brushes over the top of a filter member located on the carriage 52. Upon further movement of the carriage 10, an abutment 76 integral with the carriage and extending downwardly into the path of the carriage 52, engages the latter carriage so that it also moves toward the right hand position beneath the cylinder. At this time, the insert 48 will be in registry with the sub-carriage 52 and the insert and the sub-carriage then form the side and the bottom wall portions of a cup-like receptacle capable of carrying a charge of fresh ground coffee to the brewing station 11.

The sub-carriage 52 is provided with an orifice 77. A porous filter member 78 covers the orifice. While various types of filter members could be employed, I prefer the use of a filter formed of a stainless steel plate electro-etched with extremely small holes having a diameter of about .005". These filters present an extremely smooth surface with holes so fine that there is practically no chance that they will be clogged by dirt or the grounds. It can be easily wiped clean by the wiper 75. In preferred practice, the screen is etched in a circular pattern having an overall diameter about the same as that of the inside diameter of insert 48. A support member such as a heavy wire mesh screen 79 may be placed in a recess 80 within the bottom portion of the cup 52 in order to prevent undue flexing of the filter plate.

A coffee hopper 82, shown most clearly in FIGURES 2 and 3, is located at the left-hand side of the cylinder 12. The hopper 82 has an outwardly flaring mouth 83 positioned to receive a charge of coffee from the outlet spout 84 of a cannister 85 which is filled with ground coffee.

The cannister is provided with suitable feed means, including a rotatable auger 85a (FIGURE 1) which delivers a predetermined quantity of fresh ground coffee into the hopper 82 at a point prior to the start of the brewing cycle. The cannister is carried on a plate 86 mounted on a suitable frame member 87 by means of hinges 88. The arrangement is such that the cannister 85 may be pivoted about the hinge pins of the hinges 88 and moved away from the brewing apparatus to a point at which the supply of coffee may be easily replenished.

The hopper 82 is provided with a gate 90 pivotally mounted on a pin 91 secured to a plate 92. A leaf spring 93 urges gate 90 upwardly so that it covers the opening in the bottom of the hopper 82. A lever 94 is pivoted on a pin 95 at a point slightly above and to one side of the bottom of the hopper. The lever has an arm 96 which bears against a flange on the hopper gate 90. A downwardly extending arm of the lever 94 carries a pin 97. Pin 97 projects into the path of travel of an upright abutment plate 98 secured to the carriage 10, by any suitable means such as a machine screw 99. The abutment 98 and pin 97 are positioned so that just after the insert 48, which forms the cup side wall portion, moves into registry with the carriage 52, the abutment strikes the pin 97 and pivots the lever 94 about the pivot point 95. The upper arm of the lever presses downwardly against the gate 90 to pivot the latter about its support shaft 91. The charge of coffee within the hopper 82 drops into the cup-like receptacle. Further movement of the carriage moves the abutment out of engagement with the pin 97 and the hopper door shuts under the influence of the spring 93. The lever 94 may be provided with a spring 100 to hold it in position with its arm 96 riding on the edge of the door 90.

On its forward stroke, the cyclic drive mechanism of the invention moves the cup to the right a slight distance beyond the position shown in FIGURE 6. At that point the cylinder 12 is moved downwardly by the cycling mechanism in a manner to be described hereinafter, into a position below the top of the V-shaped abutment 61 as shown clearly in FIGURE 7.

As soon as the cylinder moves down, the drive mechanism releases the carriage 10 and springs 43 and 54 move the carriage and sub-carriage back to the left slightly until the walls 101 of the abutment strike the side walls of the cylinder 12 thus centering the cup exactly under the cylinder. During this time period, the cylinder 12 is moved further down. The lip of the cylinder engages a sealing ring 48a located in an annular recess at the top of the cup and forces the insert 48, the sub-carriage 52 and the drain 55 downward, compressing the heavy coil springs 39. These springs maintain the parts in tight fitting, sealed relationship, thereby forming a chamber for brewing the hot beverage.

The chamber is provided with a water supply spout 102 located slightly above the cylinder 12 (FIGURES 1 and 4). The spout is connected with a suitable hot water supply tank which supplies the necessary volume of hot water when the chamber is formed. When the cylinder moves down into sealing position with sealing ring 48a and before the piston 13 begins its downward movement, a gap is formed between the piston and the cylinder through which the water is supplied. Once the water is supplied to the chamber, the piston 13 moves downwardly from the position shown in FIGURE 3 to that shown in FIGURE 6 forcing the volume of water through the coffee and out of the drain 55.

The drive mechanism for moving the parts from the position in FIGURE 3 to that shown in FIGURE 6 will now be described.

A motor 110 and a reduction gear box 111 are mounted at the top of the box-like frame structure shown in FIGURE 1. Gear box 111 is provided with an output pinion 112 which meshes with a driven gear 113 secured to a shaft 114. Cams 115, 116, 117 and 118 are mounted on the shaft 114. The shaft also carries a gear segment 119 best shown in FIGURES 1 and 5. Shaft 114 rotates through 360° during each brewing cycle, in a counter-clockwise direction from the position shown in FIGURE 1.

The gear segment 19 is positioned so that after a few degrees of rotation of the shaft 114, the gear teeth mesh with those on a pinion 120. The pinion 120 is mounted for rotation on a shaft 121, which also carries the drive sprocket 74 which, as previously described, is interconnected with the drive sprocket 72 by means of the timing belt 73, as best shown in FIGURE 2. The shaft 121 is rotatably supported upon a plate 122 pivoted upon a pivot pin 123. This construction is shown in detail in FIGURE 5. A spring 124 urges the plate and the pinion into a position in which the teeth of the pinion will engage those of the segmented gear 119. Plate 122 provides a yieldable mounting for the pinion to prevent the teeth from jamming and possibly breaking upon engagement of the pinion and gear.

Referring now to FIGURES 1 and 2, roller 125, mounted on the movable beam 27, rides on the peripheral surface of the cam 116. The U-shaped extension 31 which is connected to the upper end of piston rod 30, carries a roller 126 which rides on the periphery of the cam 115, as shown in dotted lines in FIGURE 1.

At the start of the brewing cycle, the drive mechanism rotates shaft 114 a few degrees at which point the teeth of gear segment 119 engage the teeth of the pinion 120. The pinion rotates shaft 121, sprocket 74 and drives timing belt 73 which rotates the pulley 65 to wind up the cable 60 to move the carriage 10 beneath the cylinder 12. After hopper 82 has unloaded its charge of coffee and the hopper door has reclosed, arm 117 closes a microswitch 117a which drives coffee auger 85 to refill the hopper.

When the gear segment has moved to the point at which its teeth are about to move out of engagement with those on the pinion 120, the cable has moved carriage 10 and the sub-carriage 52 into position beneath the cylinder 12. At this point, roller 125 is moved downwardly by the rise 126 of the cam 116 and causes the cylinder 12 to move downwardly. The cross beam 27 compresses the springs 28 and 29. Shortly thereafter, the teeth on the segmented gear move out of engagement with those on the pinion and the carriage is free to move back to the left under the influence of the springs 43 and 54. The V-shaped centering abutment strikes the side of the cylinder as the carriage moves slightly back to the left. The cam 116 causes a slight amount of further movement of the cylinder 12 pushing the cup parts downwardly, compressing heavy coil springs 39 and a tightly sealed brewing chamber is formed.

A short interval occurs before cam 115 causes piston 13 to move downwardly. During this interval, cam 117 closes a microswitch 117a which opens a valve (not shown) and hot water is supplied to the chamber through the space between the top of cylinder 12 and the bottom of the piston 13. Cam 115 moves roller 126 downwardly, causing the piston to enter and force the water out through the drain 55 at the bottom of the chamber. As the piston moves into the cylinder a certain amount of air is trapped between the lower face of the piston and the water. This trapped air is pushed through the grounds after the water thereby forcing out a large proportion of the moisture.

Cam 115 is shaped so that upon continued rotation of shaft 114 the roller 116 moves up rapidly to withdraw the piston. Shortly thereafter, the cam 116 moves to the position in which roller 125 is allowed to rise to lift the cylinder 12. The shaft 114, the cams 115 and 116 and the gear segment 119 now move to position to start the next cycle.

As soon as the cylinder 12 moves above the level of the abutment surface 101 of the V-shaped abutment member 61, the carriage 10 and the sub-carriage 52 move rapidly to the left as viewed in FIGURES 3 and 4. The cover 57 moves into a position to cover the drain 55 and at about this time, the sub-carriage 52 strikes the abutment 52a. Wiper blade 75 moves across the surface of the porous filter 78 wiping the filter clean of the spent coffee grounds. The grounds fall through a suitable waste chute 128 to be discharged into a can 129 below the apparatus.

Another important feature of my invention lies in the provision of a pair of cam means which, in the illustrative embodiment, include a pair of cam tracks or ramps 130 pivotally mounted on pins 131 fixed to a suitable frame support bracket 132. The insert 48 is provided with a pair of abutments 133 extending outwardly into position to ride up on the cam guide tracks 130 as the carriage moves the insert beyond the retracted position of the carriage 52. The cam tracks are positioned to begin to lift the side wall portion 48 after the carriage 10 has moved to the point where the wiper brush 75 has passed over the filter 78. When the wiper brush passes over the filter 78, most of the grounds will have dropped down into a waste can located below the apparatus but some of these grounds may be still clinging to the inner surfaces of the cup side walls. The ramp forces the insert upwardly against the tension of the springs 50. When the cup reaches the retracted position at the extreme left hand side of the apparatus as shown in FIGURE 3, the abutments ride off the ends of the cam tracks and the springs 50 snap the insert down into its seated position in the carriage. This somewhat violent action causes any clinging grounds to drop down into the waste receptacle. During the next cycle, when the carriage 10 starts to move back to the right, the abutments 133 slide under the ramps 130 which are free to move upwardly about pins 131.

The foregoing apparatus provides a simple and effective means for rapidly brewing freshly ground coffee. The apparatus requires little maintenance and has little tendency to become clogged or contaminated with spent coffee grounds.

While the preferred embodiment of the invention has been illustrated in the brewing of hot coffee, it should be understood that the apparatus is useful in the preparation of other hot beverages formed by the infusion of a beverage forming liquid through a ground or powdered material.

I claim:

1. A coffee brewing and dispensing machine comprising:
   a hot water cylinder having an open bottom;
   a piston reciprocable in said cylinder;
   a container for holding ground coffee, said container having a filter floor-forming portion and a separate wall-forming portion, said portions being mounted for movement into and out of registry with said open bottom of the cylinder; said filter portion and said wall portion being constructed and arranged to form with the cylinder a coffee brewing chamber, when the parts are aligned; means biasing both portions of said container to a position out of alignment with said cylinder bottom; the wall portion of the container being capable of outward movement beyond that of the floor portion to a position where the spent coffee grounds may be discharged downwardly subsequent to a brewing operation; and
   means movable with the wall portion for wiping the filter portion in its travel into and out of alignment with the cylinder bottom.

2. Apparatus for brewing a beverage comprising a cylinder having an opening at one end, a piston within said cylinder, a cup for a charge of particulate beverage forming material, an outlet in the bottom of said cup and a porous filter covering said outlet, said cup being mounted for movement across the open end of the cylinder, cyclic drive means operable on a forward stroke to move said cup into a position beneath said cylinder, and on a return stroke to retract the cup, means operative upon movement of the cup beneath the cylinder to effect a sealing engagement between the open end of the cylinder and the top of the cup to thereby form a brewing chamber, means for supplying brewing liquid to said chamber, means for thereafter moving the piston to expel the said liquid through said outlet, said cyclic drive means including a carriage, a motor and a releasable drive connection between the motor and the carriage for driving said carriage during its forward stroke and for disconnecting the motor from the carriage at the end of the forward stroke thereof, said drive means further including spring biasing means connected to said carriage for driving the carriage in its return stroke, an abutment on the carriage engageable with said cylinder upon release of said drive connection to prevent return of the carriage, and means for disengaging the abutment from the cylinder upon passage of the liquid through the outlet to release the carriage for movement under the influence of the biasing means.

3. Apparatus according to claim 2 wherein said releasable drive connection comprises a segmented gear driven by said motor and a pinion driven thereby;
   and means interconnecting the pinion and the carriage to move the carriage in its forward stroke, the teeth on the gear segment moving out of engagement with the teeth on the pinion at the end of said stroke thereby releasing and disconnecting the carriage from the motor.

4. Apparatus according to claim 2 wherein said abutment is provided with a V-shaped recess;
   the sides of the recess being positioned to engage said cylinder to center the cup with respect thereto following release of the drive connection.

5. Apparatus for brewing a beverage comprising a cylinder having an opening at one end;
   a piston within said cylinder;
   a cup containing a beverage forming material;
   an outlet in the bottom of said cup and a porous filter covering said outlet;
   said cup being mounted for movement across the open end of the cylinder;
   cyclic drive means operable on a forward stroke to move said cup into a position beneath said cylinder, and on a return stroke to retract the cup;
   means operative upon movement of the cup beneath the cylinder to effect a sealing engagement between the open end of the cylinder and the top of the cup to thereby form a brewing chamber;
   means for supplying brewing liquid to said chamber;
   means for thereafter moving the piston to expel the said liquid through said outlet;
   said cup including a side wall portion and a bottom portion separable therefrom, said side wall and said bottom portions being mounted for movement across the open end of the cylinder;
   said side wall portion, when the cup is retracted, being more remote from the cylinder than said bottom portion;
   said cyclic drive means being connected to the side wall portion to move the side wall portion on the forward stroke into registry with the bottom portion;
   means thereafter constraining both of said cup portions to move together into position beneath said cylinder, and means operable upon retraction of the cup portions to stop said bottom portion at its pick-up position while the side wall portion continues to its fully retracted position.

6. Apparatus according to claim 5, further including a carriage;
   an opening in said carriage;
   said side wall portion being adapted to seat within said opening for conjoint movement with said carriage;
   spring connection means between the side wall portion and the carriage for maintaining said portion in seated position on the carriage;
   cam means located in the path of travel of said side wall portion during movement thereof to retracted position;
   said cam means being formed to lift said side wall portion with respect to said carriage and to release said side wall portion for downward movement after said wall portion has moved beyond the position at which the cup bottom portion has stopped.

7. Apparatus according to claim 5, further including a wiper member mounted for movement with the cup side wall portion;
   said wiper member extending below said side wall portion and engageable with said bottom member to wipe said member upon movement of the side wall into and out of registry therewith.

8. Apparatus for brewing a beverage comprising a cylinder having an opening at one end;
   a piston within said cylinder;
   a cup having a side wall portion and a separable bottom wall portion, an outlet in the bottom wall and a porous filter member covering said outlet;
   means for filling the cup with beverage-forming material;
   said side wall portion and said bottom wall portion being independently mounted for movement in a generally transverse plane below the open end of the cylinder;
   drive means for moving said cup into a position beneath the cylinder;
   means operative upon movement of the cup beneath the cylinder to effect a sealing engagement between the open end of the cylinder and the cup portions to thereby form a brewing chamber;
   means for supplying brewing liquid to said chamber;
   means for thereafter moving the piston to expel the said liquid through said brewing material to said outlet;
   said drive means being operable to move the cup away from said cylinder subsequent to the passage of the liquid; and
   abutment means engageable with the cup bottom upon movement of the cup away from the cylinder to separate the bottom from the side wall portion upon continued movement of the side wall portion by the drive means.

9. Apparatus according to claim 8, further including a carriage having an opening therein, means supporting said cup wall portion within said opening, spring means interconnecting the wall portion with the carriage;
cam means located adjacent the path of travel of the side wall portion;
abutment means on the side wall portion engageable with the cam means;
said cam means being shaped to raise said side wall portion against the action of said spring and thereafter to release said side wall for abrupt return into normal position on the carriage thereby removing any loose grounds clinging to the side walls.

10. Apparatus according to claim 9, wherein the inner walls of the side wall portion are flared outwardly toward the cup base.

11. Apparatus according to claim 8, further including a hopper having a discharge opening for supplying ground beverage forming material to said cup, a gate covering said opening and means for opening said gate to discharge the material upon registry of the cup side and bottom wall portions.

12. Apparatus according to claim 11, further including a pivotal mounting for said gate, and wherein the means for opening the gate includes a lever having an arm engaging said gate at a point spaced from the gate pivot and a second arm extending to a point adjacent the path of movement of said cup side wall portion;
said gate opening means further including a trip movable with said cup side wall portion and engageable with said lever to open the gate upon registry of the cup side and bottom wall portions.

13. Apparatus according to claim 8, further including a trip member movable with the cup side wall portion;
a hopper having a discharge opening for supplying ground coffee to said cup;
a pivoted gate covering said opening;
a lever having an arm engageable with said gate and a second arm located in the path of said trip member;
said trip being positioned to pivot said lever to open the gate upon registry of the cup bottom and side wall portions.

14. Apparatus for brewing a beverage comprising a cylinder having an opening at one end;
a piston movable within said cylinder;
a cup having a side wall portion and a separable bottom portion, an outlet in the bottom and a filter covering said outlet, said side wall portion and said bottom portion being independently mounted for sliding movement in a generally transverse plane below the open end of the cylinder;
cyclic drive means operable on a forward stroke to move said cup side wall and bottom portions from separated retracted positions to a position of registry beneath said cylinder, and on a return stroke to retract the cup portions;
means operative upon movement of the cup portions beneath the cylinder to effect a sealing engagement between the open end of the cylinder and the top of the cup to thereby form a brewing chamber;
means for supplying brewing liquid to said chamber;
means for thereafter moving the piston within the cylinder, thereby expelling the preselected volume of liquid through said outlet;
said cyclic drive means being operable to retract the cup subsequent to passage of the liquid through the outlet; and
abutment means located in the path of travel of the cup bottom portion and engageable therewith upon retraction of the cup by the cyclic drive means to stop the bottom portion at a position intermediate the position beneath the cylinder and the position of retraction of the cup side wall portion.

15. Apparatus for brewing a beverage including a brew member for a charge of brewing liquid, said member having a brewing liquid discharge opening therein, a brewing receptacle for carrying a charge of coffee beneath said brew member, said receptacle including a floor portion having an outlet orifice and a porous filter covering said orifice, said receptacle further including a separable side wall portion, said side wall portion being movable into registry with said floor portion and the adjacent opening in the brew member to form a brewing chamber, said side wall portion being movable away from said brew member to a position beyond the limits of the floor portion subsequent to a brewing operation, a wiper mounted for movement with the side wall portion, said wiper being movable in a path in which the wiping action proceeds from one side of the filter to the other with the wiper in contact with the filter upon movement of the side wall portion to said position beyond the limits of the floor portion.

16. Apparatus for brewing a beverage including a brew member for a charge of brewing liquid and having a brewing liquid discharge opening therein, a receptacle for a charge of particulate beverage material comprising a portion forming a filter floor and a separate wall forming portion, said floor and wall portions being conjointly movable into and out of registry with a beverage charging station and with the opening in said brew member and forming with the brew member a brewing chamber when said portions are in registry with the brew member, said wall and floor portions being mounted for relative movement with respect to one another to positions in which the wall portion is out of registry with the floor portion and in which the spent beverage material may be discharged subsequent to a brewing operation, and drive means operable when said portions are out of registry with each other and with said brew member opening for sequentially moving said wall and floor portions into registry with each other and for thereafter moving the registered wall and floor portions conjointly into registry with said brew member opening.

17. Apparatus for brewing a beverage including a brew member for a charge of brewing liquid and having a brewing liquid discharge opening therein, a receptacle for a charge of particulate beverage material comprising a portion forming a filter floor and a separate wall forming portion, said wall portion being movable into and out of registry with said floor portion and with the opening in said brew member, the receptacle forming with the brew member a brewing chamber when said wall portion is in registry with the brew member, and means for jarring the wall portion independently of the filter portion when the wall portion is out of registry with the floor portion to dislodge particulate beverage material from the wall portion after a brew operation.

18. Apparatus according to claim 17 further including a support member movable with said wall portion during its travel into and out of registry with said floor portion and with the opening in said brew member, and wherein said jarring means includes means for biasing said wall portion into supporting engagement with said support, means for moving said wall portion away from said support, and for thereafter releasing said wall portion for an abrupt return into engagement with said support.

19. Apparatus for brewing a beverage including a brewing chamber adapted to receive charges of particulate beverage material, said chamber having a wall portion and a filter floor portion which are relatively separable, said filter floor portion comprising a smooth surfaced metallic filter having openings therein substantially smaller than the size of the particles of beverage material, means forming a pressure seal between said portions when they are not separated, mechanism for forcing a charge of brewing liquid through said beverage material and said filter when said seal is formed, to thereby effect brewing of the beverage, mechanism providing for relative axial separation of said wall and floor portions to disengage the seal, and means for cleaning the filter between brewing operations including a wiper connected to said wall portion and movable therewith, said wiper being positioned outside the limits of said pressure seal when said portions are not separated from each other and movable with said wall portion in a path extending across the surface of said filter and in which the wiping action proceeds from one side of the filter to the other with the wiper in contact with the filter when the seal is disengaged.

20. Apparatus according to claim 19 wherein said openings have a diameter of about 0.005 inch.

References Cited
UNITED STATES PATENTS

| | | | |
|---|---|---|---|
| 1,390,008 | 9/1921 | Arduino. | |
| 2,558,062 | 6/1951 | Selzer | 99—289 |
| 2,907,266 | 10/1959 | Moulden | 99—289 |

FOREIGN PATENTS

| | | |
|---|---|---|
| 1,184,141 | 2/1959 | France. |
| 515,285 | 2/1955 | Italy. |

WILLIAM I. PRICE, *Primary Examiner.*

WALTER A. SCHEEL, *Examiner.*

S. P. FISHER, *Assistant Examiner.*